US012084198B2

(12) United States Patent
Zhuang

(10) Patent No.: US 12,084,198 B2
(45) Date of Patent: Sep. 10, 2024

(54) VISUAL MODEL OF FLIGHT ATTITUDE

(71) Applicant: Le Zhuang, Nanjing (CN)

(72) Inventor: Le Zhuang, Nanjing (CN)

( * ) Notice: Subject to any disclaimer, the term of this patent is extended or adjusted under 35 U.S.C. 154(b) by 337 days.

(21) Appl. No.: 17/824,668

(22) Filed: May 25, 2022

(65) Prior Publication Data

US 2022/0380061 A1    Dec. 1, 2022

(51) Int. Cl.
*B64D 45/00* (2006.01)
*B64D 43/00* (2006.01)
*G02B 27/01* (2006.01)

(52) U.S. Cl.
CPC .................................. *B64D 45/00* (2013.01)

(58) Field of Classification Search
CPC ...................................................... B64D 45/00
See application file for complete search history.

(56) References Cited

U.S. PATENT DOCUMENTS

| 4,790,756 A * | 12/1988 | Caldwell | G09B 19/0061 |
| | | | 40/364 |
| 5,945,985 A * | 8/1999 | Babin | G09B 27/08 |
| | | | 715/209 |
| 2016/0264255 A1 * | 9/2016 | Connor | H04N 23/90 |
| 2021/0403175 A1 * | 12/2021 | Kyono | G06F 18/214 |

* cited by examiner

*Primary Examiner* — Joseph H Feild
*Assistant Examiner* — Pameshanand Mahase
(74) *Attorney, Agent, or Firm* — Mark A. Goodman; Goodman Law Center

(57) ABSTRACT

An apparatus for visually indicating attitude of an aircraft in flight is disclosed. The apparatus includes an aircraft model, a cross-shaped LED lamp, a dome filled with damping fluid, a vertical tube, an earth model, and a laser pointer. The apparatus is installable into a cockpit of an aircraft and allows a pilot of the aircraft to see the flight attitude of the aircraft indirectly through the apparatus. Particularly, the apparatus is used under emergency conditions, such as when the internal attitude instrument is out of order and the external environment cannot be effectively visualized. Thus, the apparatus provides a safety guarantee in situations of manual flight in low visibility.

20 Claims, 3 Drawing Sheets

VISUAL MODEL OF FLIGHT ATTITUDE

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of flight safety of existing art and more specifically relates to a flight attitude visual model.

BACKGROUND

Modern aircraft generally have a full set of advanced instruments. Pilots can perform all-weather autopilot, from taking-off to landing, with the help of the cockpit instruments, without looking outside the cockpit. A potential risk is of this however is that when the instruments fail due to accidents (e.g., solar storm, electromagnetic interference, circuit fault, parts aging, improper maintenance, etc.) and when, unfortunately, the visibility is low (e.g., late at night, thick clouds, no credible references), the aircraft in instrument-flying mode might encounter unexpected trouble, which could lead to a major disaster.

One tragic example of such disaster was the crash of Peruvian Air Flight 603 on Oct. 2, 1996. The cause of this accident was that the ground staff forgot to take off a piece of adhesive tape on a sensor in the routine maintenance. As a direct result, the plane's instruments failed in a confounding manner after liftoff, issuing contradictory warnings of both speeding and stalling. Automatic pilot was impossible because the instrument signals were chaotic. In addition, it was during the night, and the pilots neither could rely on instrument signals nor could they rely on visible objects outside of the cockpit. Therefore, the pilots could only perform manual flight based on their experience, and the result was that the aircraft crashed into the ocean around 40-50 kilometers from the airport.

Such auxiliary instrument failure does not necessarily lead to air disaster, because the aircraft's overall structure, power system, control system and other hardware that enable flight are not affected. In the Peruvian air disaster, if the pilot could have maintained level flight with medium accelerator for several hours above the ocean to wait for dawn or wait for a pilot plane, there is a chance that the disaster would not have happened. Regretfully, the pilots in this accident were unable to judge the attitude of their aircraft, and thus unable to control the aircraft properly to maintain the aircraft safely for a longer time, losing the chance of a safe return.

SUMMARY OF THE INVENTION

In view of the foregoing disadvantages inherent in the known flight safety art, the present disclosure provides a novel visual model of flight attitude. The general purpose of the present disclosure, which will be described subsequently in greater detail, is to provide an apparatus that is installable into a cockpit of an aircraft and is able to provide a visual indicator of the aircraft's attitude during flight. During normal operation of the flight attitude instrument, and in the condition of high visibility, the pilot of the aircraft may disregard the visual model of flight attitude only as a decoration in the cockpit. In the failure of flight attitude instruments and when manual flight is obligatory in low visibility environment (late night, thick clouds, etc.), the pilots can ascertain the correct attitude of the aircraft by looking at the visual model of flight attitude. Therefore, the visual model of flight attitude is beneficial to improve the pilot's control confidence and flight safety.

In some embodiments of the present disclosure, an apparatus for visually indicating attitude of an aircraft in flight is disclosed herein. The apparatus may include a cross-shaped LED lamp, a dome, a vertical tube, an earth model, and a laser pointer. The cross-shaped LED lamp may be fixedly installed into a cockpit of the aircraft. In some embodiments, the apparatus may further include an aircraft model; in this embodiment, the cross-shaped LED lamp may be fixed to the aircraft model and the aircraft model may be fixedly installed into the cockpit of the aircraft.

The dome may be attached under the cross-shaped LED lamp and may be covered with longitude and latitude lines. The vertical tube may be attached at an upper end thereof to a center of the cross-shaped LED lamp. The vertical tube may hang into an interior of the dome and the earth model may be attached to a lower end of the vertical tube. As such, the earth model may hang toward a bottom of the dome. The laser pointer may be attached to a bottom center point of the earth model and configured to project a laser beam onto a wall of the dome.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a visual model of flight attitude, constructed and operative according to the teachings of the present disclosure.

The various embodiments of the present invention will hereinafter be described in conjunction with the appended drawings, wherein like designations denote like elements.

DETAILED DESCRIPTION

Figure 1:
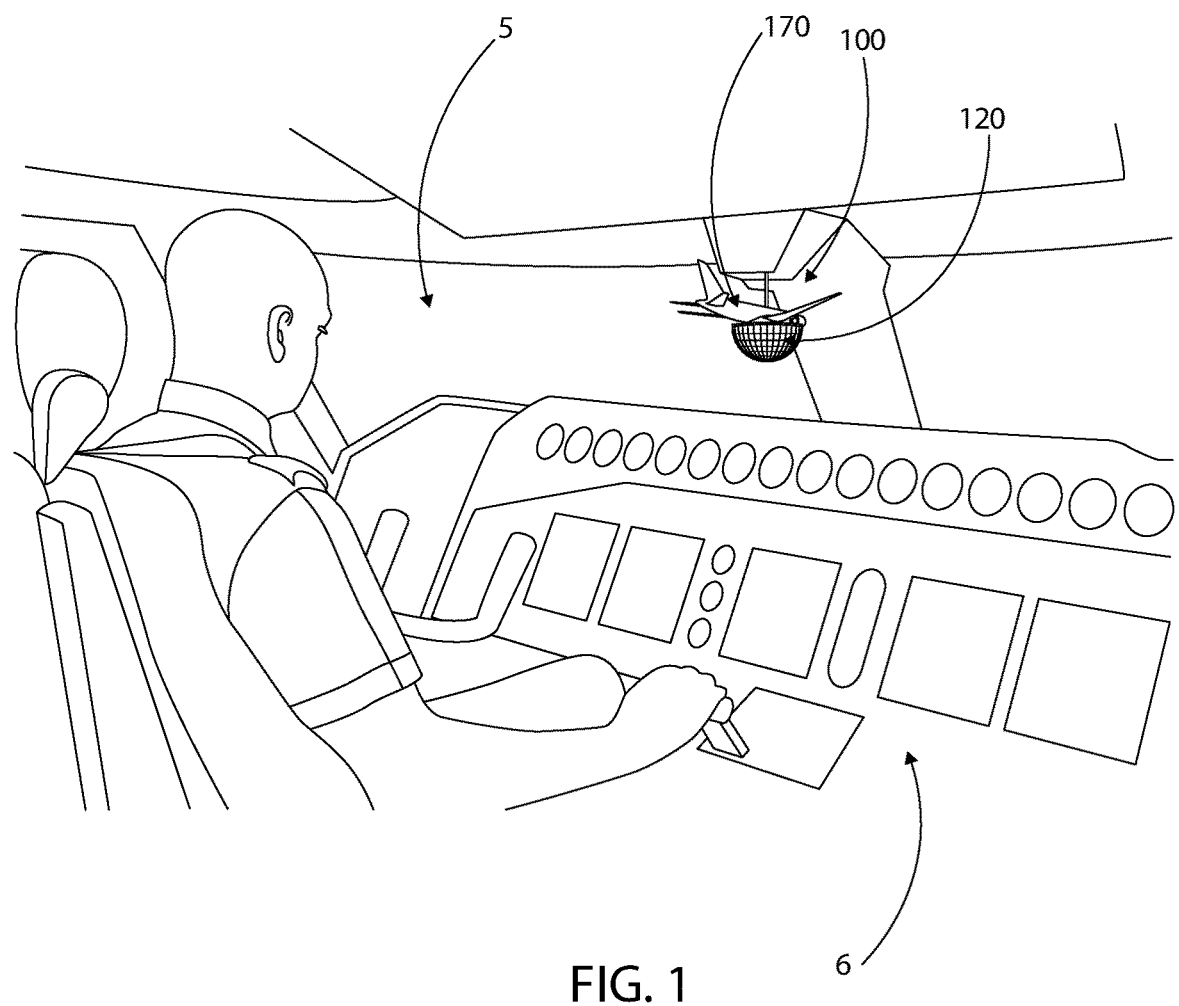
FIG. 1 is a perspective view of an apparatus installed into a cockpit of an aircraft and being used for visually indicating attitude of the aircraft during flight, according to an embodiment of the disclosure.

As discussed above, embodiments of the present disclosure relate to flight safety instruments and more particularly to a visual model of flight attitude. The visual model of flight attitude enables a pilot of an aircraft to see the flight attitude of the aircraft when an internal attitude instrument is out of order and external vision is not effective (for example if dark outside or over the ocean). A majority of the time, the visual model of flight attitude may simply be an ornament in the cockpit, which has no impact on the pilot or the aircraft. In extreme circumstances, it becomes the flight attitude visual model, enabling pilots to correctly understand the attitude of the flight, guaranteeing pilots the ability to hover the aircraft safely until conditions arise that will get the aircraft out of the predicament.

Two important features of the present disclosure include a support or hanger, such as an aircraft model; and an earth model. The aircraft model is installed into a cockpit of the aircraft. After the aircraft model is fixed, it keeps the same attitude as the (real) aircraft. In other words, the attitude of the aircraft to the Earth is exactly the same as the attitude of the aircraft model to the earth model. This is because the earth model should always point its center of gravity straight toward the center of the Earth. As such, when the pilot sees the attitude of the aircraft model, he knows exactly how his plane is flying.

The size ratio of the aircraft model to the earth model does not match the size ratio of the aircraft to the Earth, but the relative positions are the same. The apparatus may replicate a reverse of real-life behavior of an aircraft and the Earth. For example, in 'real-life' the aircraft is moving relative to the Earth; in the present disclosure, the 'earth' (earth model) moves relative to the 'aircraft' (aircraft model).

The present disclosure uses the principles of gravity. Specifically, as discussed above, the natural tendency of any object in the Earth's gravitational field is always to point straight towards the center of the Earth. As such, the visual model of flight attitude is no less reliable than gyroscopes or electronic meters. The visual model of flight attitude includes a highly reliable working process that is completely independent, and no external factors are expected to have impact on it. Particularly, the present disclosure uses a miniature dome to insulate the effects of the wind; it eliminates potential inertial effects with damping fluid; and it removes magnetic impurities from the earth model, ruling out all possible magnetic influences. There are no technical vulnerabilities in the working process, and the probability of potential mis-operation in practice is extremely low.

The visual model of flight attitude may be low cost, which is compatible with the risk probability (lower than 1 over 106) of manual flight in a low visibility environment (in other words, the probability that the visual model of flight attitude will need to be used for its emergency purpose). This is highly balanced in terms of economic input and flight safety. It makes up a small probability security loophole effectively whilst requiring low economic investment, so it is highly feasible.

Figure 2:
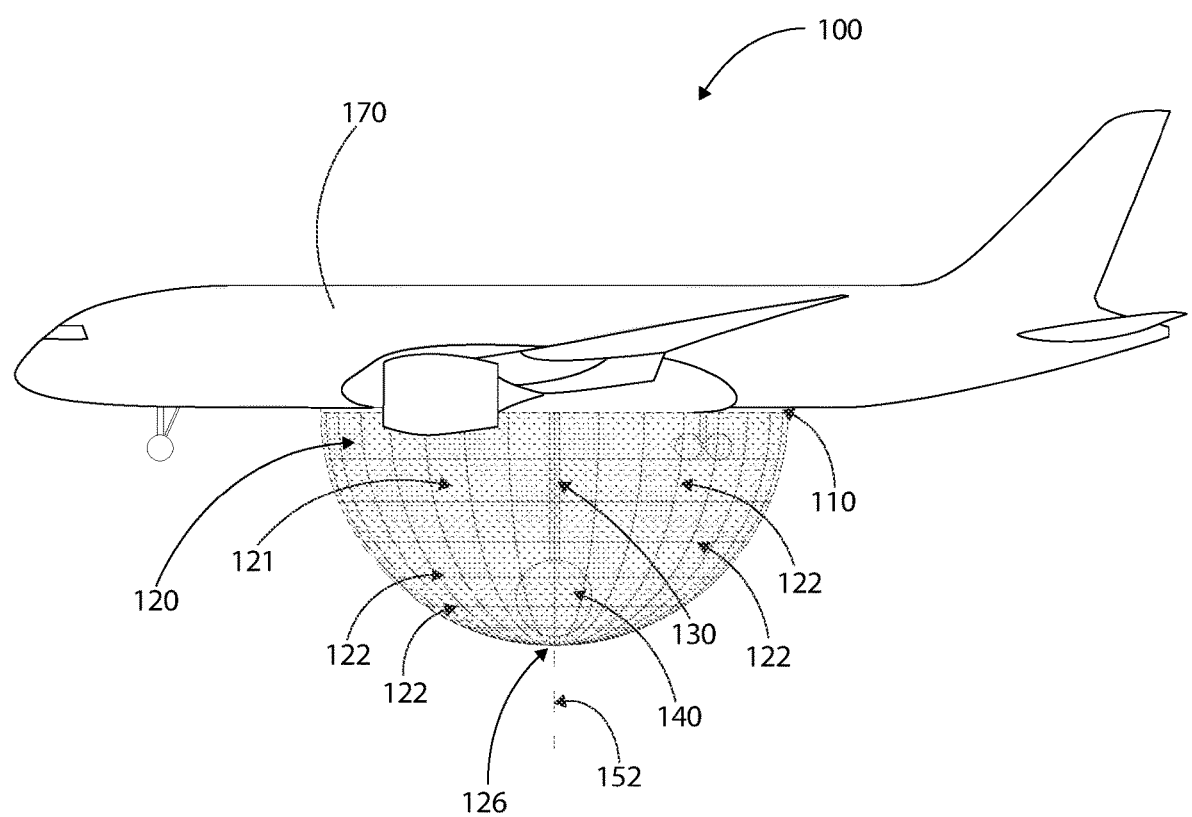
FIG. 2 is a side view of the apparatus including an aircraft model, a vertical tube, a dome filled with damping fluid, and an earth model, according to an embodiment of the present disclosure.
Figure 3:
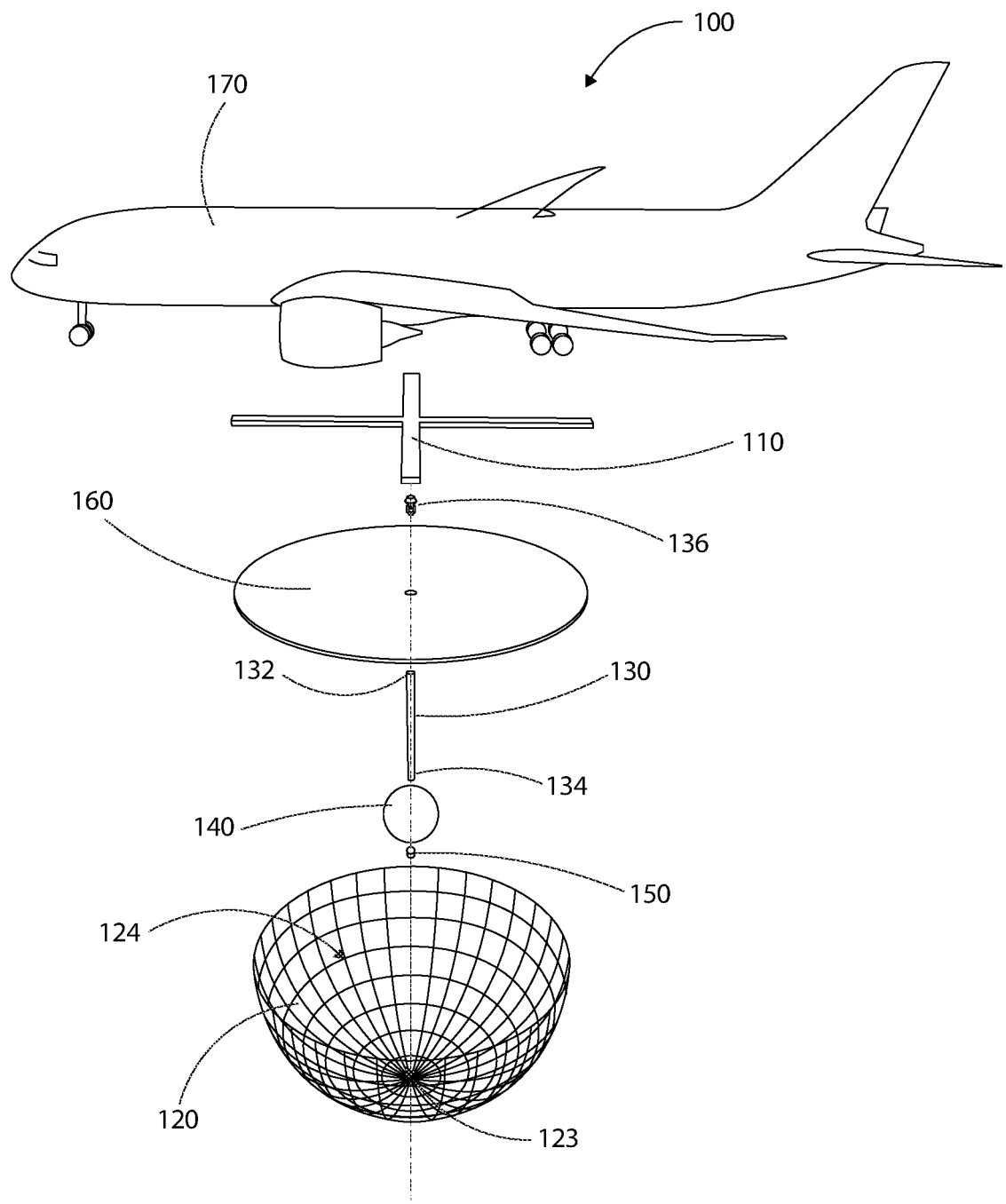
FIG. 3 is an exploded view of the apparatus of FIG. 2 with damping fluid removed from the dome for clarity, according to an embodiment of the present disclosure.

Referring now more specifically to the drawings by numerals of reference, there is shown in FIGS. 1-3, various views of an apparatus for visually indicating attitude of an aircraft in flight 100. As shown, the apparatus 100 may include a cross-shaped LED lamp 110, a dome 120, a vertical tube 130, an earth model 140, and a laser pointer 150. In some embodiments, the cross-shaped LED lamp 110 may be fixedly installed into a cockpit 6 of a (real) aircraft 5. In other embodiments, the apparatus 100 may further include an aircraft model 170. In this embodiment, the aircraft model 170 may be fixedly installed into the cockpit 6 of the aircraft 5 and the cross-shaped LED lamp 110 may be fixed to an underside (or 'abdomen') of the aircraft model 170. As shown in FIG. 1, the aircraft model 170 may be installed such that a pilot of the aircraft 5 is able to easily view the apparatus 100 at a quick glance. During installation, the aircraft model 170 may be oriented the same as the aircraft 5. For example, the aircraft model 170 may be oriented in the same direction as the aircraft 5 and with the same angle of tilt or pitch as the aircraft 5. Further, the aircraft model 170 and the cross-shaped LED lamp 110 may be fixed to limit movement thereof.

The cross-shaped LED lamp 110 may include different colors along a longitudinal direction and along a latitudinal direction thereof. Further, the aircraft model 170 may include red vertical portions (nose/tail 0 degrees-180 degrees) and blue horizontal portions (wings on both sides 90 degrees-270 degrees).

As above, the aircraft model 170 may be used as an ornament or decorative feature in the cockpit 6 during normal flight. As such, the aircraft model 170 may include the same model, color and number of the aircraft 5 in which it is installed. The aircraft model 170 may further include a rechargeable battery located within the underside (abdomen) of the aircraft model 170. Normally, the apparatus 100 may be powered via an external power supply. However, in the event of a failure of the external power supply, the rechargeable battery may supply backup power to the apparatus 100 for a period of time; preferably hours.

As shown in FIG. 2, the dome 120 may be mounted under the cross-shaped LED lamp 110. Particularly, the dome 120 may be fixed to the cross-shaped LED lamp 110, again to limit movement thereof. As discussed above, the dome 120 may be used to insulate the effects of the wind. The dome 120 may include a 180 degree hemi-sphere shape and may be transparent so as to enable the pilot to view an interior 124 of the dome 120 quickly (and thus the vertical tube 130 and the earth model 140). Further, the dome 120 may be covered with longitude and latitude lines 122 and a clear central point mark 123 (FIG. 3) arranged at a bottom center thereof. The longitude and latitude lines 122 may be oriented 0 degrees relative to the central point mark 123. Internal lines may be set to, for example, 3 degrees, 5 degrees, 6 degrees, 8 degrees, 10 degrees—any number that is appropriate.

As shown in FIG. 2, an interior 124 of the dome 120 may be filled with damping fluid 121. The damping fluid 121 may preferably be transparent, again to enable the pilot to view the vertical tube 130 and the earth model 140. As above, the transparent damping fluid 121 may eliminate potential inertial effects. Further, as shown in FIG. 3, a rubber cover 160 may be provided with the apparatus 100. The rubber cover 160 may be arranged atop the dome 120 and allows the damping fluid 121 to expand and contract thermally.

The vertical tube 130 may include a white LED lamp, which may be flexible, and also serve as a spreader. As shown in FIGS. 2-3, the vertical tube 130 may be attached at an upper end 132 thereof to a center of the cross-shaped LED lamp 110 and may hang into the interior 124 of the dome 120. Particularly, the vertical tube 130 may be attached at a crossing point of the cross-shaped LED lamp 110. The upper end 132 of the vertical tube 130 may be attached via a universal joint 136 (FIG. 3) and the earth model 140 may be attached to a lower end 134 of the vertical tube 130 toward a bottom of the dome 120. The universal joint 136 may enable free movement (for example, swinging) of the vertical tube 130, and thus the earth model 140, within a range of 180 degrees. Particularly, because a center of gravity of the earth model 140 will automatically point toward a center of the Earth (regardless of horizontal and vertical tilt of the aircraft model 170), this movement is facilitated by the universal joint 136.

The earth model 140 may be maintained several millimeters from the bottom 126 of the dome 120. Further, as shown, a laser pointer 150 may be attached to a bottom center point 142 of the earth model 140. The laser pointer 150 may be configured to project a laser beam 152 onto a wall of the dome 120 and an angle of the laser beam 152 may indicate pitch or shake angle of the aircraft model 170. As such, for example, when the aircraft model 170 is perfectly horizontal, the laser beam 152 coincides with the clear central point mark 123 on the dome 120.

The earth model 140 is made from a heavy metal material with strict elimination of internal impurities that may be magnetized. For example, the heavy metal material may be a diamagnetic heavy metal material. Thereby, as discussed above, all possible magnetic influences are prevented.

The apparatus 100 may function as follows (assuming the internal longitudinal/latitudinal lines 122 to be 5°). After the apparatus 100 is installed in the cockpit 6 of the aircraft 5, the only allowed free movement is the earth model 140 suspended at the lower end 134 of the vertical tube 130. When the aircraft 5 is accelerating, braking, taking off, or in turbulence, the earth model 140 may shake violently. At this point, the damping fluid 121 will come into play, keeping the earth model's 140 wobble within a controllable range, and then consuming the inertia of the earth model's 140 pendulum motion. When the aircraft 5 is slowly changing position or flying smoothly, the damping fluid 121 will not strongly interfere with the movement of earth model 140. The earth model 140 will automatically point vertically, gently but consistently, to a center of the Earth, following its own gravity.

This constant and automatic vertical orientation of the earth model 140 toward the center of the Earth is based on law of physics, regardless of the pitch or shake angle of the aircraft model 170 (within the range of 0-180° as designed, of course). Therefore, relative position of the earth model 140 must represent the relative position of the Earth. An angle read via the laser beam 152 projected by the laser pointer 150 on the wall of the dome 120 marks pitch or shake angle of the aircraft model 170. If the laser beam 152 falls 5° left (right) on the horizontal line, it is 5° left (right) tilt of aircraft model 170; if the laser beam 152 falls 10° forward (back) of the vertical line, it is 10° tilt (pitch) angle of aircraft model 170; if the laser beam 152 falls within the range of 0 to 90°, it means that aircraft model 170 is hovering right down; if the laser beam 152 falls within the range of 180 to 270°, it means that aircraft model 170 is hovering left up.

Since the necessary alignment between the aircraft model 170 and the real aircraft 5 is determined at the time of installation, this is also the angle of tilt or pitch of the real aircraft 5 with respect to the Earth. If the laser beam 152 of the earth model 140 overlaps with the central point mark 123 on the wall of the dome 120, the aircraft 5 is flying horizontally. A glance is sufficient for the pilots in need.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The numbered list format used in the claims of the application is used solely for organizational purposes to provide clarity thereto and is not meant to limit in any way the claimed matter nor any aspect of the present disclosure.

What is claimed is:

1. An apparatus for visually indicating attitude of an aircraft in flight, the system comprising:
    a) a cross-shaped LED lamp fixedly installed into a cockpit of the aircraft;
    b) a dome mounted under the cross-shaped LED lamp, the dome being covered with longitude and latitude lines;
    c) a vertical tube attached at an upper end thereof to a center of the cross-shaped LED lamp and hanging into an interior of the dome;
    d) an earth model attached to a lower end of the vertical tube toward a bottom of the dome; and
    e) a laser pointer attached to a bottom center point of the earth model, the laser pointer configured to project a laser beam onto a wall of the dome.

2. The apparatus of claim 1, further comprising an aircraft model fixedly installed into the cockpit of the aircraft and oriented the same as the aircraft, and wherein the cross-shaped LED lamp is fixed to an underside of the aircraft model.

3. The apparatus of claim 1, wherein the interior of the dome is filled with transparent damping fluid.

4. The apparatus of claim 3, further comprising a rubber cover arranged atop the dome, the rubber cover allowing the damping fluid to expand and contract thermally.

5. The apparatus of claim 4, wherein the dome further includes a clear central point mark arranged at a bottom center thereof.

6. The apparatus of claim 5, wherein the longitude and latitude lines are oriented 0 degrees relative to the central point mark.

7. The apparatus of claim 1, wherein the cross-shaped LED lamp includes different colors along a longitudinal direction and along a latitudinal direction thereof.

8. The apparatus of claim 7, wherein the upper end of the vertical tube is attached to the cross-shaped LED lamp via a universal joint, thereby enabling free movement of the vertical tube, and thus the earth model, within a range of 180 degrees.

9. The apparatus of claim 8, wherein the vertical tube includes a white LED lamp.

10. The apparatus of claim 1, wherein the earth model is made of a diamagnetic heavy metal material.

11. An apparatus for visually indicating attitude of an aircraft in flight, the system comprising:
    a) an aircraft model fixedly installed into a cockpit of the aircraft and oriented the same as the aircraft;
    b) a cross-shaped LED lamp fixed to an underside of the aircraft model;
    c) a dome mounted under the cross-shaped led lamp, the dome being covered with longitude and latitude lines;
    d) a vertical tube attached at an upper end thereof to a center of the cross-shaped led lamp and hanging into an interior of the dome;
    e) an earth model attached to a lower end of the vertical tube toward a bottom of the dome; and f) a laser pointer attached to a bottom center point of the earth model, the laser pointer configured to project a laser beam onto a wall of the dome.

12. The apparatus of claim 11, wherein the interior of the dome is filled with transparent damping fluid.

13. The apparatus of claim 12, further comprising a rubber cover arranged atop the dome, the rubber cover allowing the damping fluid to expand and contract thermally.

14. The apparatus of claim 13, wherein the dome further includes a clear central point mark arranged at a center of a bottom thereof.

15. The apparatus of claim 14, wherein the longitude and latitude lines are oriented 0 degrees relative to the central point mark.

16. The apparatus of claim 11, wherein the cross-shaped LED lamp includes different colors along a longitudinal direction and along a latitudinal direction.

17. The apparatus of claim 16, wherein the upper end of the vertical tube is attached to the cross-shaped LED lamp via a universal joint, thereby enabling free movement of the vertical tube, and thus the earth model, within a range of 180 degrees.

18. The apparatus of claim 17, wherein the vertical tube further includes a white LED lamp tube.

19. The apparatus of claim 11, wherein the earth model is made of a diamagnetic heavy metal material.

20. An apparatus for visually indicating attitude of an aircraft in flight, the system comprising:
   a) an aircraft model fixedly installed into a cockpit of the aircraft and oriented the same as the aircraft;
   b) a cross-shaped LED lamp fixed to an underside of the aircraft model, the cross-shaped LED lamp including different colors along a longitudinal direction and along a latitudinal direction;
   c) a dome mounted under the cross-shaped LED lamp, the dome including a clear central point mark arranged a center of a bottom thereof and an interior filled with transparent damping fluid, the dome further being covered with longitude and latitude lines, the longitude and latitude lines being oriented 0 degrees relative to the central point mark;
   d) a rubber cover arranged atop the dome, the rubber cover allowing the damping fluid to expand and contract thermally;
   e) a vertical tube attached at an upper end thereof to a center of the cross-shaped LED lamp via a universal joint and hanging into the interior of the dome, the vertical tube further including a white LED lamp tube;
   f) an earth model attached to a lower end of the vertical tube toward a bottom of the dome, the earth model being made of a diamagnetic heavy metal material, and wherein the universal joint enables free movement of the vertical tube, and thus the earth model, within a range of 180 degrees; and
   g) a laser pointer attached to a bottom center point of the earth model, the laser pointer configured to project a laser beam onto a wall of the dome.

* * * * *